April 9, 1935.  R. P. PARROTT  1,997,470
AIRPORT ILLUMINATION
Filed April 2, 1932
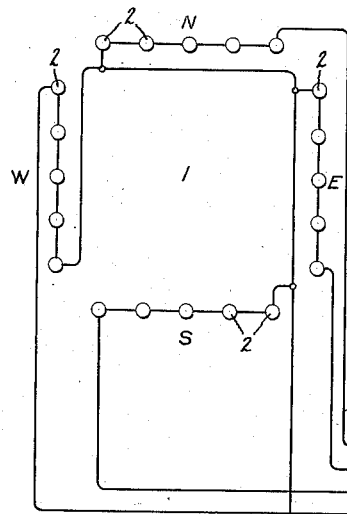
Fig.1.
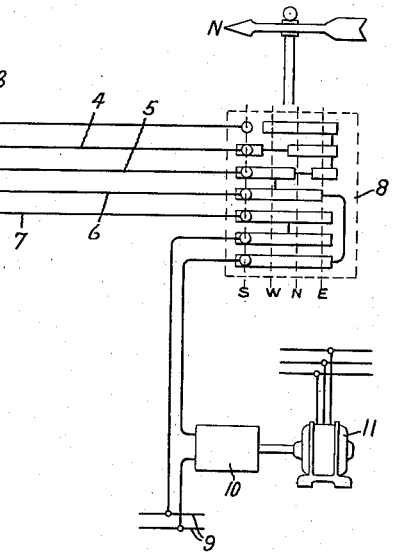
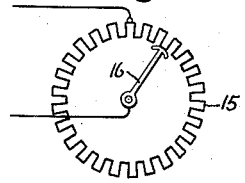
Fig.2.
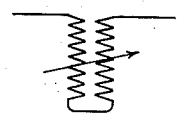
Fig.3.
Fig.4.
Inventor:
Robert P. Parrott,
by Charles E. Tullar
His Attorney.

Patented Apr. 9, 1935

1,997,470

UNITED STATES PATENT OFFICE 1,997,470

AIRPORT ILLUMINATION

Robert P. Parrott, Washington, D. C., assignor to General Electric Company, a corporation of New York Application April 2, 1932, Serial No. 602,821

4 Claims. (Cl. 177—352)

My invention relates to the illumination of aviation landing fields, and more particularly to a manner of illuminating the outer limits of the field to clearly distinguish it from the other illuminated areas.

A landing field which may be quickly and accurately located is a very important factor in aiding successful night flying. The placing of illuminating devices about the boundary of the field is not of itself sufficient because the increasing use of street lights may cause city blocks or other illuminated areas to be mistaken for the landing field. Furthermore, in addition to the identification of the field, it is very important to signal the direction of the wind to aircraft wishing to land so that a landing may be made against the wind.

An object of my invention is to provide an improved means and method for identification of an aviation landing field so that there will be no difficulty in recognizing it as such.

A further object of my invention is to provide for the illumination of the field in such a manner as to give an indication of the direction of the wind.

A still further object of my invention is to provide for the identification of aviation landing fields so as to differentiate them from other lighted areas.

It is yet another object of my invention to signal the location of landing fields with standard illuminating equipment.

Other and further objects of my invention will be apparent from the disclosure in the drawing and as the description proceeds.

In accordance with my invention, illuminating devices of any selected type are disposed around the border of the landing field. These units may be mounted in any suitable manner either being flush with the ground or mounted on concrete posts of suitable height which rest on top of the ground. To provide an unmistakable signal identifying the landing field I interpose in the electrical circuit of the illuminating devices a means for periodically varying the intensity of the illuminating devices. Thus, it will be seen that all of the lights about the landing field will constantly change from their maximum brilliancy to a much lower intensity and the approaching aircraft navigator seeing the intensity of these lights periodically changing will immediately recognize it as a landing field. The direction of the wind may be made known by disconnecting the group of lights along the side of the field which is opposite the side facing the direction of the wind, or, if preferred, the side or end facing the direction of the wind. For example, if the wind is from the north the southern side of the field would not be illuminated and the aircraft would be brought to earth by flying toward the illuminated side of the field on the north. The usual wind vane, in cooperation with a commutator interposed in the circuit to the illuminating devices, may be used to control the number and location of the lights to be energized.

Referring to the drawing, Fig. 1 diagrammatically shows my invention applied to a landing field, and Figs. 2, 3 and 4, respectively, show different ways of periodically changing current flow.

In accordance with my invention I place around the border landing field 1, a number of electric lights 2, which may be flush with the ground, or located on suitable supports above the ground. Preferably I place the lights on supports sufficiently high above the ground to be above the usual snow level, the supports resting on top of the ground so that if an aircraft should strike one of them it would be bowled over without injuring the aircraft. Separate circuits are provided for the lights along each side of the landing field. These circuits are represented by wires 3, 4, 5 and 6, the common return wire being indicated at 7. The energization of these circuits is controlled by a commutator 8 which is operated by a wind vane. Interposed in the circuit from the source of supply 9 to the commutator is a current changer 10 which may be driven by electric motor 11. For example, with a southerly wind, the wind vane pointing in this direction moves the commutator so that the circuits to the lights along the sides W, E and S are energized and the circuit to the lights N is broken. Thus an incomplete enclosure is formed, the opening or dark end being on the opposite side of the field from which the wind blows. An airplane craft about to make a landing would fly over the dark portion N and this would insure his landing against the wind with safety.

To identify the landing field I constantly signal approaching aircrafts by periodically varying the intensity of the illuminating devices disposed around the border of the field which are energized through the commutator. This periodicity is obtained by any suitable means designated as 10 in Fig. 1. Fig. 2 represents means 10 as comprising a resistance 15 of circular form and a cooperating rotatable contact 16 driven by electric motor 11. Contact 16 periodically changes the amount of resistance interposed in the circuit of the lights. Fig. 3 represents a series transformer whose coupling may be varied periodically to change the amount of current flowing to the illuminating devices, and Fig. 4 illustrates still a further modification where a transformer is indicated at 17 and the periodicity is obtained by varying periodically the number of windings on one side of the transformer. These are only representative of a number of ways in which current flow may be periodically changed and any selected means for varying the current may be used.

While the embodiments of the invention illustrated in the drawing have been described with particularity, it is to be expressly understood that the invention is not limited thereto, as the invention may be carried out in a variety of ways.

What I claim as new and desire to secure by Letters Patent of the United States is:

1. The method of identifying landing fields for airplanes and the like in which the field is bounded by a series of electric lights which comprises energizing the lights on three sides of the field with the side opposite the one which is facing the direction of wind left dark, and periodically varying the illumination of the energized lights.

2. Means for identifying an aviation landing field including a number of illuminating devices disposed around its border and arranged to indicate the outline of the field, means for energizing said devices with a current of periodically varying strength, and means for disconnecting the lights along the side of the field opposite the one facing the direction of the wind.

3. In an aviation landing field having a number of illuminating devices disposed around its border, means for energizing said devices in a manner to identify said landing field, and means responsive to wind direction for modifying said first mentioned means to energize a part of said devices to bound an incomplete closure.

4. In an aviation landing field, means for identifying said field including a plurality of illuminating devices for indicating the outline of said field, means for energizing said devices with a periodically varying current, and means for extinguishing said devices on one side of said landing field and for selecting the said side in response to wind direction so as to indicate the direction from which the plane is to enter the field.

ROBERT P. PARROTT.